(12) United States Patent
Jimbo et al.

(10) Patent No.: US 12,730,122 B2
(45) Date of Patent: Sep. 8, 2026

(54) FLUID MEASUREMENT SYSTEM AND FLUID MEASUREMENT METHOD

(71) Applicant: FUJI ELECTRIC CO., LTD., Kanagawa (JP)

(72) Inventors: Naomichi Jimbo, Tokyo (JP); Naoki Takeda, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 561 days.

(21) Appl. No.: 18/183,337

(22) Filed: Mar. 14, 2023

(65) Prior Publication Data

US 2023/0384340 A1 Nov. 30, 2023

(30) Foreign Application Priority Data

May 25, 2022 (JP) ................................ 2022-085537

(51) Int. Cl.
*G01P 5/22* (2006.01)
*G01F 1/708* (2022.01)
*G01F 1/712* (2006.01)

(52) U.S. Cl.
CPC ................ *G01P 5/22* (2013.01); *G01F 1/708* (2013.01); *G01F 1/712* (2013.01)

(58) Field of Classification Search
CPC ............ G01P 5/22; G01F 1/712; G01F 1/708
See application file for complete search history.

(56) References Cited

U.S. PATENT DOCUMENTS 7,261,002 B1 8/2007 Gysling et al.
2012/0090404 A1* 4/2012 Dietz ..................... G01F 1/667 73/861.18
2015/0122049 A1 5/2015 Berkcan et al.
(Continued)

FOREIGN PATENT DOCUMENTS

JP 2004-264195 9/2004
JP 2004264195 A * 9/2004
(Continued)

OTHER PUBLICATIONS

Patent examination report mailed on Mar. 17, 2025 issued with respect to the corresponding New Zealand Patent Application No. 798038.
David Dorran: "Cross Correlation Demo using Matlabs xcorr function", published on Apr. 25, 2014, <https://www.youtube.com/watch?v=RO8s1TrEIEw>.
(Continued)

*Primary Examiner* — Jennifer Bahls
(74) *Attorney, Agent, or Firm* — IPUSA, PLLC

(57) ABSTRACT

A fluid measurement system includes a first sensor and a second sensor disposed on a same pipe and spaced apart from each other by a predetermined distance; and a measurement controller configured to calculate a flow velocity of a fluid flowing through the pipe based on first output that is output from the first sensor and second output that is output from the second sensor. The measurement controller performs a process including (a) comparing the first output and the second output in a first period of time so as to repeatedly calculate a first time difference between the first output and the second output while shifting the first period of time, (b) calculating a second time difference based on a frequency of occurrence of a plurality of first time differences each calculated in the first period of time, and (c) calculating the flow velocity based on the second time difference.

4 Claims, 7 Drawing Sheets

(56) References Cited

U.S. PATENT DOCUMENTS

| | | | |
|---|---|---|---|
| 2017/0322063 | A1 | 11/2017 | Sisler et al. |
| 2022/0034696 | A1 | 2/2022 | Conrads |
| 2024/0255333 | A1 | 8/2024 | Conrads |
| 2025/0198819 | A1 | 6/2025 | Conrads |

FOREIGN PATENT DOCUMENTS

| | | | | |
|---|---|---|---|---|
| JP | 2016-109428 | | | 6/2016 |
| JP | 2018-005342 | | | 1/2018 |
| JP | 2018005342 | A | * | 1/2018 |
| JP | 2020-159790 | | | 10/2020 |
| JP | 2022-501586 | | | 1/2022 |

OTHER PUBLICATIONS

The Pennsylvania State University: "8.2 Cross Correlation Functions and Lagged Regressions", published on Mar. 14, 2020, <https://web.archive.org/web/20200314102439/https://online.stat.psu.edu/stat510/lesson/8/8.2>.

Office Action mailed on Feb. 20, 2024 issued with respect to the basic Japanese patent application No. 2022-085537.

Patent examination report dated Dec. 19, 2024 issued with respect to the New Zealand Patent Application No. 798038.

Office Action mailed on Oct. 7, 2025 issued with respect to the corresponding Japanese Patent Application No. 2024-156597.

Office Action mailed on Jan. 13, 2026 issued with respect to the basic Japanese patent application No. 2022-085537.

* cited by examiner

FLUID MEASUREMENT SYSTEM AND FLUID MEASUREMENT METHOD

CROSS-REFERENCE TO RELATED APPLICATIONS

This application is based on and claims priority to Japanese Patent Application No. 2022-085537, filed on May 25, 2022, the entire contents of which are incorporated herein by reference.

BACKGROUND OF THE INVENTION

1. Field of the Invention

The disclosure herein relates to a fluid measurement system and a fluid measurement method.

2. Description of the Related Art

Patent Document 1 discloses a method for calculating a phase composition ratio of a two-phase mixture in a pipe. Patent Document 1 discloses a method for calculating the flow velocity of the two-phase mixture by using load cells disposed upstream and downstream of the pipe to compare patterns measured by the load cells at two respective locations.

For flow velocity measurement using a correlation method in which measured patterns are compared as disclosed in Patent Document 1, there may be cases where desired results cannot be obtained due to the influence of noise caused by vibration or sound.

RELATED-ART DOCUMENTS

Patent Documents

Patent Document 1: U.S. Patent Application Publication No. 2017/0322063

SUMMARY OF THE INVENTION

The present disclosure provides a fluid measurement system and a fluid measurement method, in which the flow velocity of a measurement fluid can be measured with high accuracy.

According to an aspect of the present disclosure, a fluid measurement system includes a first sensor and a second sensor that are disposed on a same pipe and spaced apart from each other by a predetermined distance; and a measurement controller configured to calculate a flow velocity of a fluid flowing through the pipe based on first output that is output from the first sensor and second output that is output from the second sensor. The measurement controller performs a process including (a) comparing the first output and the second output in a first period of time so as to repeatedly calculate a first time difference between the first output and the second output while shifting the first period of time, (b) calculating a second time difference based on a frequency of occurrence of a plurality of first time differences, each of the first time differences being calculated in the first period of time included in a second period of time that is greater than the first period of time, and (c) calculating the flow velocity based on the second time difference.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
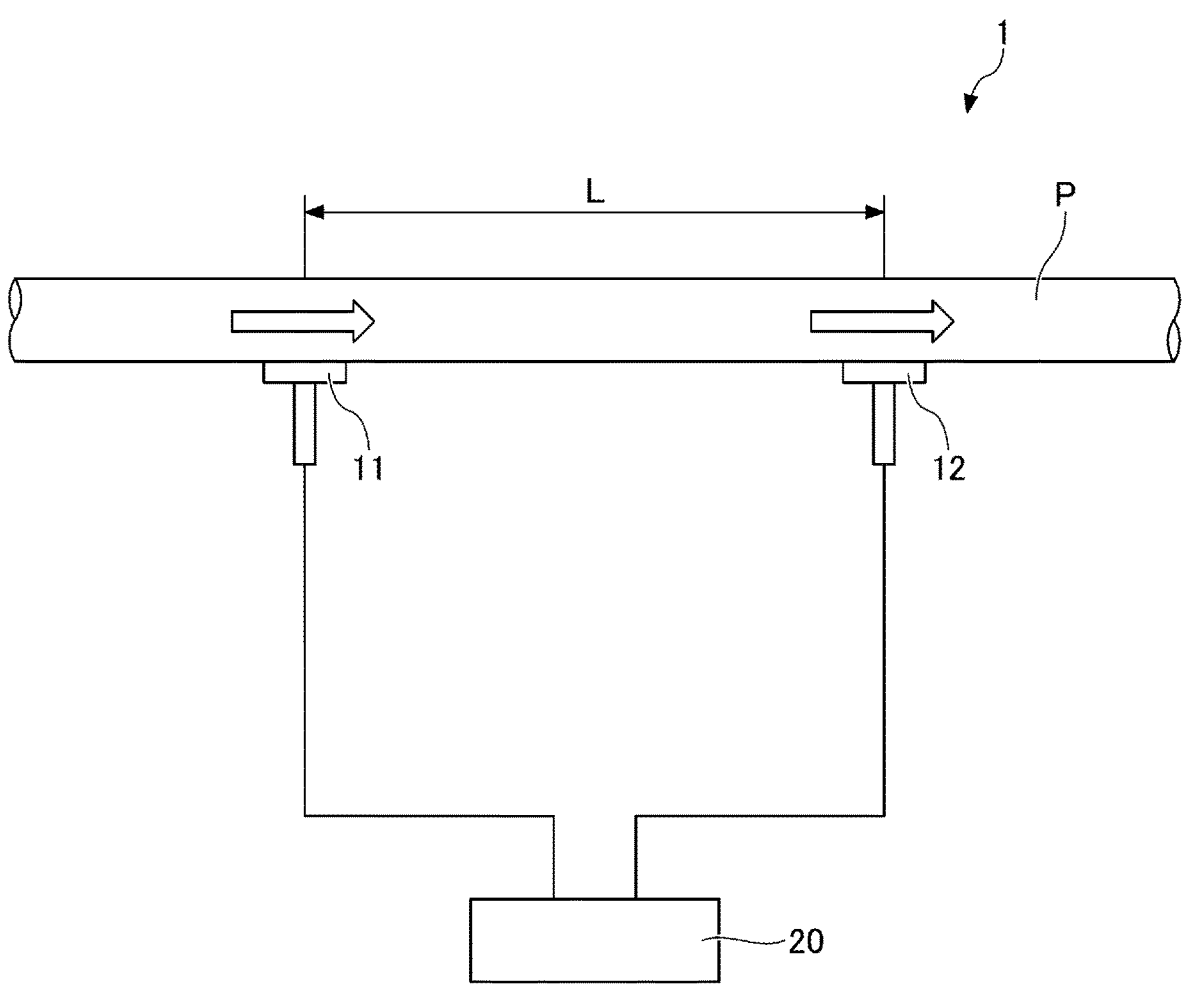
FIG. 1 is a diagram illustrating an overall configuration of a fluid measurement system according to an embodiment.

According to a fluid measurement system and a fluid measurement method of the present disclosure, the flow velocity of a measurement fluid can be measured with high accuracy.

In the following, embodiments of the present invention will be described with reference to the accompanying drawings. In the specification and the drawings associated with the embodiments, components having substantially the same or corresponding functional configurations are denoted by the same numerals and the description thereof will not be repeated. For ease of understanding, the components illustrated in the drawings may not be to scale.

<<Fluid Measurement System 1>>

FIG. 1 is a diagram illustrating an overall configuration of a fluid measurement system 1 during use according to an embodiment. The fluid measurement system 1 is a system that measures the flow velocity of a fluid flowing through a pipe P. The fluid measurement system 1 obtains, for example, the flow velocity of a two-phase fluid in which liquid and gas are mixed. Examples of the two-phase fluid to be measured include a mixed fluid of hot water and steam in a geothermal power plant. Further, the fluid measurement system 1 may obtain the flow rate by multiplying the obtained flow velocity by the cross-sectional area of a flow path. Note that arrows in FIG. 1 indicate a direction in which the fluid flows.

The fluid measurement system 1 includes a first sensor 11, a second sensor 12, and a measurement controller 20. The fluid measurement system 1 uses the first sensor 11 and the second sensor 12 attached to the pipe P to measure the flow velocity of the fluid flowing through the pipe P. The first sensor 11 and the second sensor 12 are installed on the same pipe, that is, the pipe P. Further, the first sensor 11 and the second sensor 12 are installed on the pipe P and spaced apart from each other by a predetermined distance (an installation distance L).

The second sensor 12 is of the same type as the first sensor 11. Each of the first sensor 11 and the second sensor 12 is, for example, a load sensor that measures a load applied to the pipe P. The load sensor is, for example, a load cell. Note that each of the first sensor 11 and the second sensor 12 is not limited to the load sensor. Each of the first sensor 11 and the second sensor 12 may be any of, for example, a vibration sensor, a capacitance sensor, a pressure sensor, a radio wave sensor, a humidity sensor, a density sensor, a temperature sensor, an electrical resistivity sensor, and an ultrasonic sensor, which can measure a quantity associated with the fluid flowing through the pipe.

Each of the first sensor 11 and the second sensor 12 performs measurements in real time. Then, each of the first sensor 11 and the second sensor 12 outputs time-series measurement results to the measurement controller 20 in real time.

Figure 2:
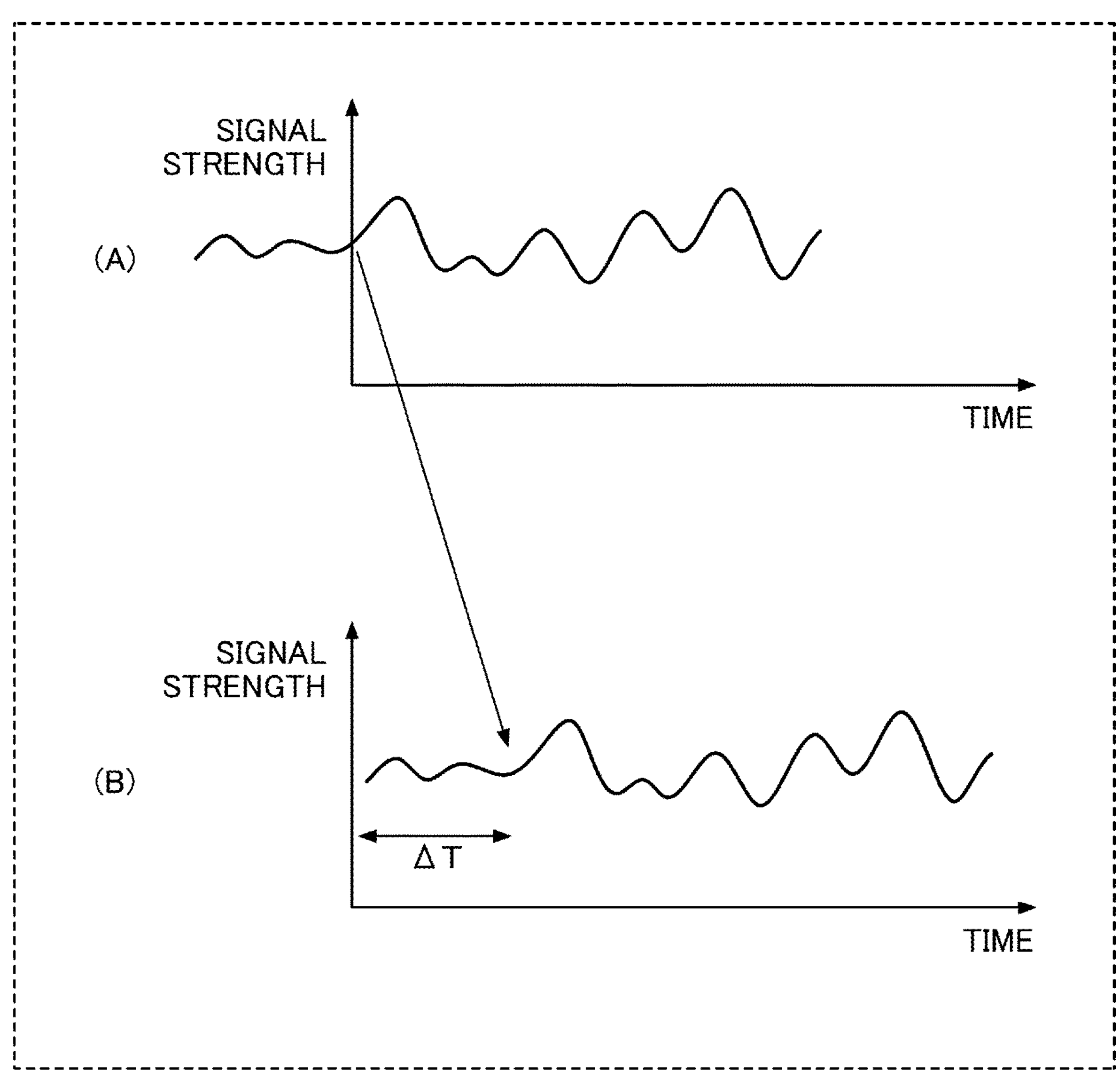
FIG. 2 is a diagram illustrating the output of each sensor of the fluid measurement system according to the present embodiment.

FIG. 2 is a diagram illustrating the output of each of the sensors of the fluid measurement system according to the embodiment. A graph (A) in FIG. 2 indicates a time-series measurement waveform output from the first sensor 11. A graph (B) in FIG. 2 indicates a time-series measurement waveform output from the second sensor 12. Each vertical axis represents the intensity of a signal output from the first sensor 11 or the second sensor 12. Each horizontal axis represents the time. The horizontal axes in the graphs (A) and (B) are identical to each other.

The second sensor 12 is provided downstream of the pipe P and is spaced apart from the first sensor 11 by the predetermined distance (installation distance L) along the pipe P. Therefore, the fluid measured by the first sensor 11 is measured by the second sensor 12 with a time delay during which the fluid is moved from the first sensor 11 to the second sensor 12. Accordingly, when a measurement result of the first sensor 11 is compared with a measurement result of the second sensor 12, the measurement result of the second sensor 12 is measured later than the measurement result of the first sensor 11. That is, the output of the second sensor 12 is measured later than the output of the first sensor 11 by a time difference ΔT.

The time difference ΔT (unit: seconds (s)) is expressed by Equation 1, in which V denotes the flow velocity of the fluid (unit: meters per second (m/s)), and L denotes the installation distance (unit: meters (m)).

$$\Delta T = L/V \quad \text{Equation 1}$$

For example, if the fluid flowing through the pipe P is a two-phase fluid, the mixing ratio of, for example, liquid to gas of the two-phase fluid differs depending on the location of the pipe P. If the mixing ratio of liquid to gas differs, the weight of the fluid differs depending on the location of the pipe P. Therefore, by employing the load sensor as each of the first sensor 11 and the second sensor 12 and measuring loads applied to different locations of the pipe P, the fluid measurement system 1 can calculate a period of time during which the fluid is moved between the first sensor 11 and the second sensor 12. Then, the fluid measurement system 1 calculates the velocity (flow velocity) of the fluid by using the period of time during which the fluid is moved between the first sensor 11 and the second sensor 12, that is, a time difference.

The fluid measurement system 1 calculates a time difference ΔTm by which a measurement result of the second sensor 12 is delayed with respect to a measurement result of the first sensor 11. That is, the time difference ΔTm calculated by the fluid measurement system 1 represents a period of time during which the fluid is moved from the first sensor 11 to the second sensor 12 within the pipe P. Therefore, the fluid measurement system 1 calculates the flow velocity Vm of the fluid by dividing the installation distance L, which is the distance between the first sensor 11 and the second sensor 12 along the pipe P, by the calculated time difference ΔTm.

The flow velocity Vm (unit: meters per second (m/s)) is calculated by Equation 2 using the time difference ΔTm (unit: seconds (s)) and the installation distance L (unit: meters (m)).

$$Vm = L/\Delta Tm \quad \text{Equation 2}$$

Note that the installation distance L may be made longer such that the time difference between the measurement result of the first sensor 11 and the measurement result of the second sensor 12 increases. However, as the installation distance L increases, the correlation between the measurement result of the first sensor 11 and the measurement result of the second sensor 12 decreases, thus making it difficult to measure the time difference. Therefore, the installation distance L may be made longer within a range that allows the time difference between the measurement result of the first sensor 11 and the measurement result of the second sensor 12 to be measured.

The measurement controller 20 acquires, as time-series data, first measurement results from the first sensor 11 and second measurement results from the second sensor 12. Then, the measurement controller 20 processes the acquired first measurement results and second measurement results so as to calculate the velocity of the fluid flowing through the pipe P.

As the first measurement results and the second measurement results, the measurement controller 20 acquires, for example, waveforms of loads with respect to time. Then, the measurement controller 20 compares the waveforms so as to calculate a time difference until when a part of the waveform, similar to a part of the waveform detected by the first sensor 11, is detected by the second sensor 12 from when the part of the waveform is detected by the first sensor 11. For example, the measurement controller 20 uses a cross-correlation method or a dynamic time warping method to calculate the time difference.

Figure 3:
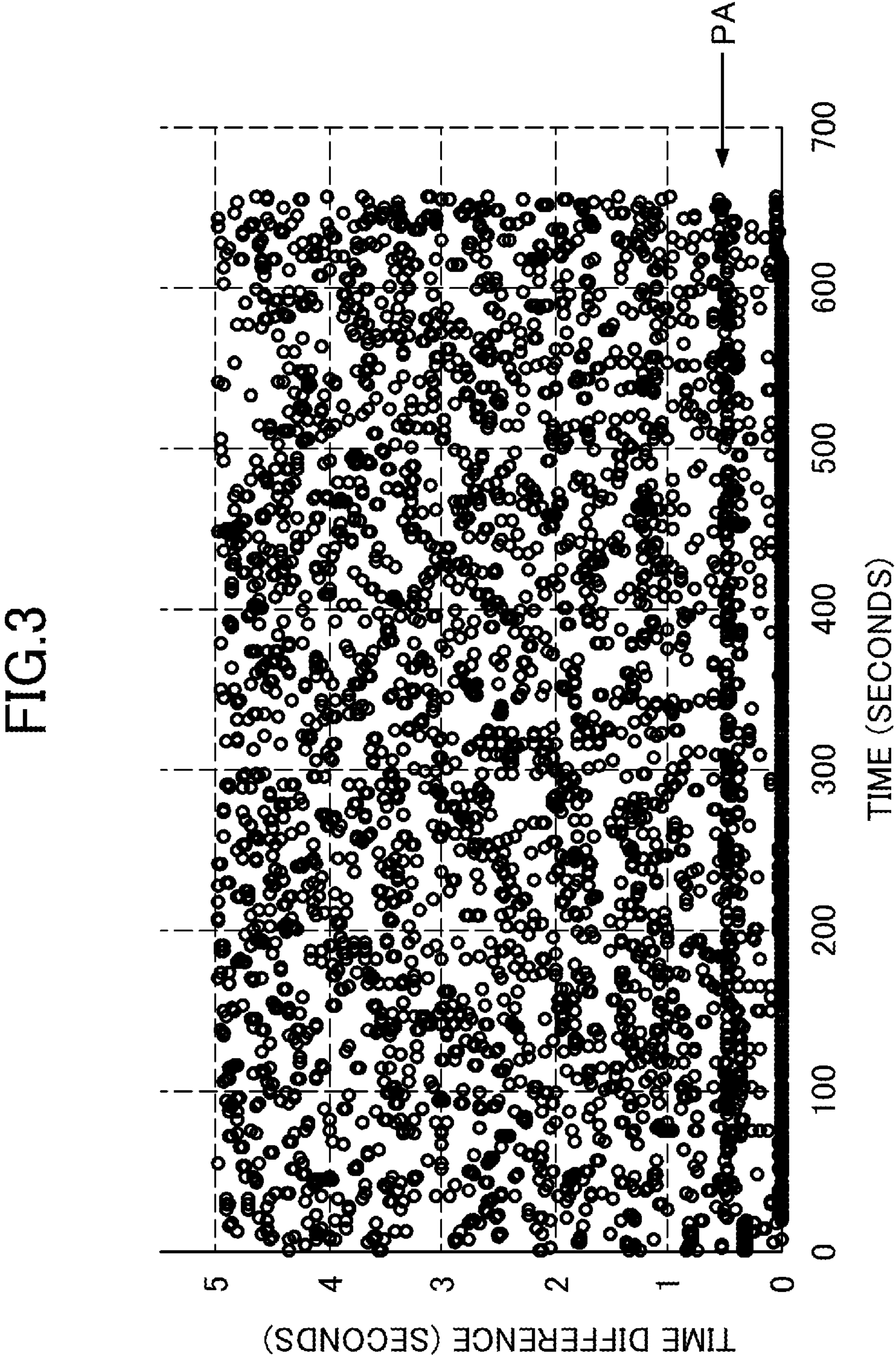
FIG. 3 is a diagram illustrating the results of calculating time differences in the fluid measurement system according to the present embodiment.

FIG. 3 illustrates the results of calculating time differences by using the fluid measurement system 1 according to the present embodiment. FIG. 3 is a diagram illustrating the results of calculating time differences in the fluid measurement system 1 according to the present embodiment. The horizontal axis in FIG. 3 indicates the time (unit: seconds) after the start of measurement. The vertical axis in FIG. 3 indicates a calculated time difference (unit: seconds).

In the results illustrated in FIG. 3, time differences are calculated in the range of 0 seconds to 5 seconds. Note that the results illustrated in FIG. 3 are results obtained by measuring a two-phase fluid flowing through the pipe P and having a fluid velocity based on which a time difference of approximately 0.5 seconds is obtained. The time differences are calculated for approximately 650 seconds.

In FIG. 3, as indicated by an arrow PA, inter-sensor transit times (that is, time differences ΔT as illustrated in FIG. 2) are mostly approximately 0.5 seconds. However, time differences other than approximately 0.5 seconds are widely present in the range of 0 seconds to 5 seconds. It is considered that the presence of the time differences other than approximately 0.5 seconds is due to the influence of noise caused by vibration, wind, or the like.

Figure 4:
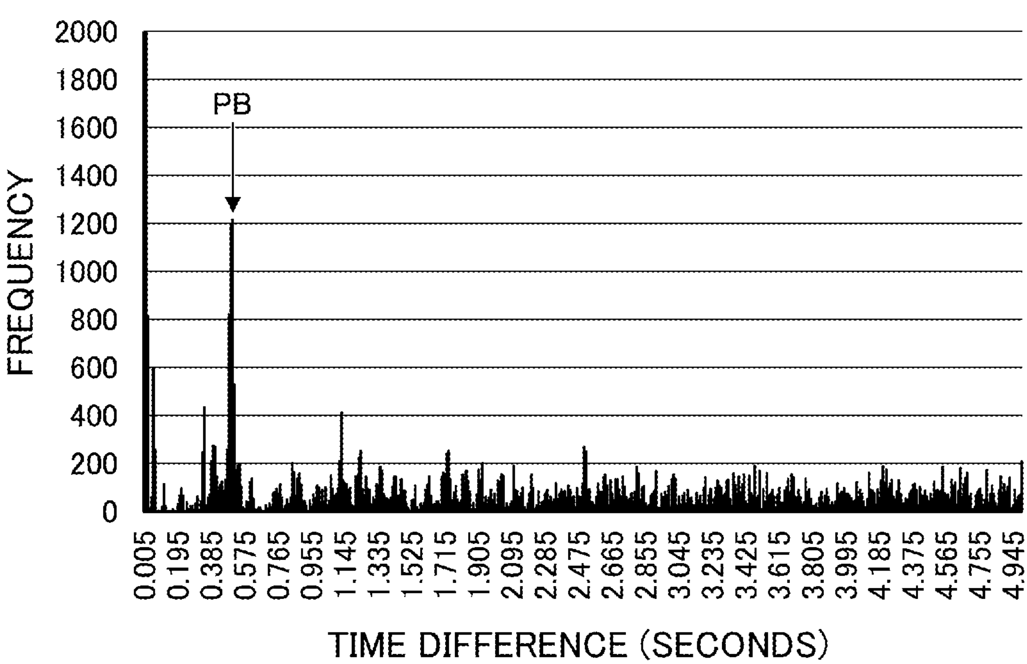
FIG. 4 is a diagram illustrating a frequency distribution of the time differences in the fluid measurement system according to the present embodiment.

FIG. 4 is a diagram illustrating a frequency distribution of the time differences measured in the fluid measurement system 1 according to the present embodiment. In FIG. 4, the results of FIG. 3 are presented in a frequency distribution. In FIG. 4, time differences of approximately 0 seconds are most frequent; however, the time differences of 0 seconds indicate errors such as a failure to calculate a transit time by cross-correlation. Therefore, the time differences of 0 seconds are excluded when the flow velocity is calculated. In FIG. 4, except for the time differences of 0 seconds, a section having the mode is a section between 0.49 seconds and 0.50 seconds as indicated by an arrow PB. That is, by obtaining a frequency distribution of measured time differences, measurement results comparable with theoretical values can be obtained.

In order to further improve the measurement accuracy of the flow velocity in the fluid measurement system 1, it is necessary to reduce the influence of erroneous results due to noise.

The fluid measurement system 1 according to the present embodiment reduces the influence of erroneous results due to noise by calculating a frequency distribution of measured time differences for each fixed period of time. By reducing the influence of erroneous results due to noise, the fluid measurement system 1 can increase the measurement accuracy of the flow velocity. Accordingly, the flow velocity can be measured with high accuracy.

With regard to processing performed in the fluid measurement system 1, first, the fluid measurement system 1 calculates a frequency distribution of measured time differences as illustrated in FIG. 3 for each fixed period of time. Next, the fluid measurement system 1 calculates the mode based on the calculated frequency distribution. Then, the fluid measurement system 1 determines the mode as an inter-sensor transit time (a time difference).

In the fluid measurement system 1, inter-sensor transit times detected by cross-correlation are considered to have a higher frequency of occurrence than erroneous results appearing as white noise. For this reason, the fluid measurement system 1 can reduce erroneous results by calculating a frequency distribution for each fixed period of time.

Figure 5:
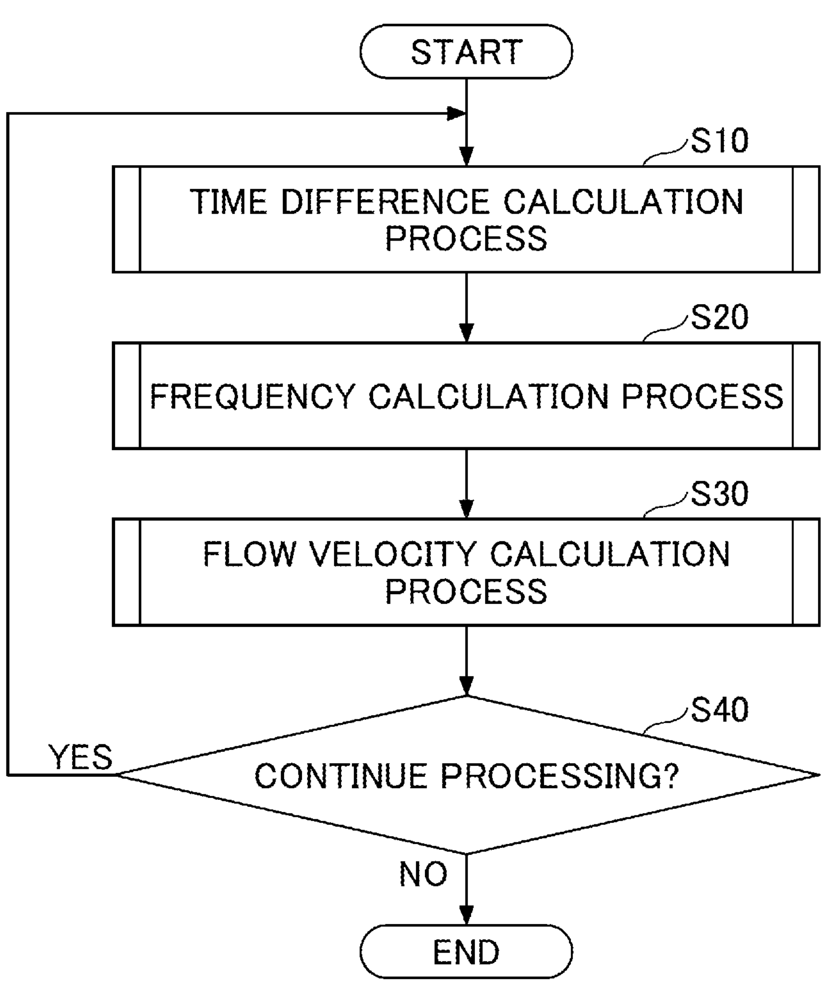
FIG. 5 is a flowchart illustrating processing performed in the fluid measurement system according to the present embodiment.

The processing performed in the fluid measurement system 1 will be described in detail. Further, processes performed by the measurement controller 20 of the fluid measurement system 1 will be described. A fluid measurement method performed in the fluid measurement system 1 will be described by describing the processing performed in the fluid measurement system 1. FIG. 5 is a flowchart illustrating the processing performed in the fluid measurement system 1 according to the present embodiment.

(Step S10)

Upon the start of the processing, the measurement controller 20 of the fluid measurement system 1 calculates a time difference in a predetermined period of time (measurement period of time) (a time difference calculation process).

Figure 6:
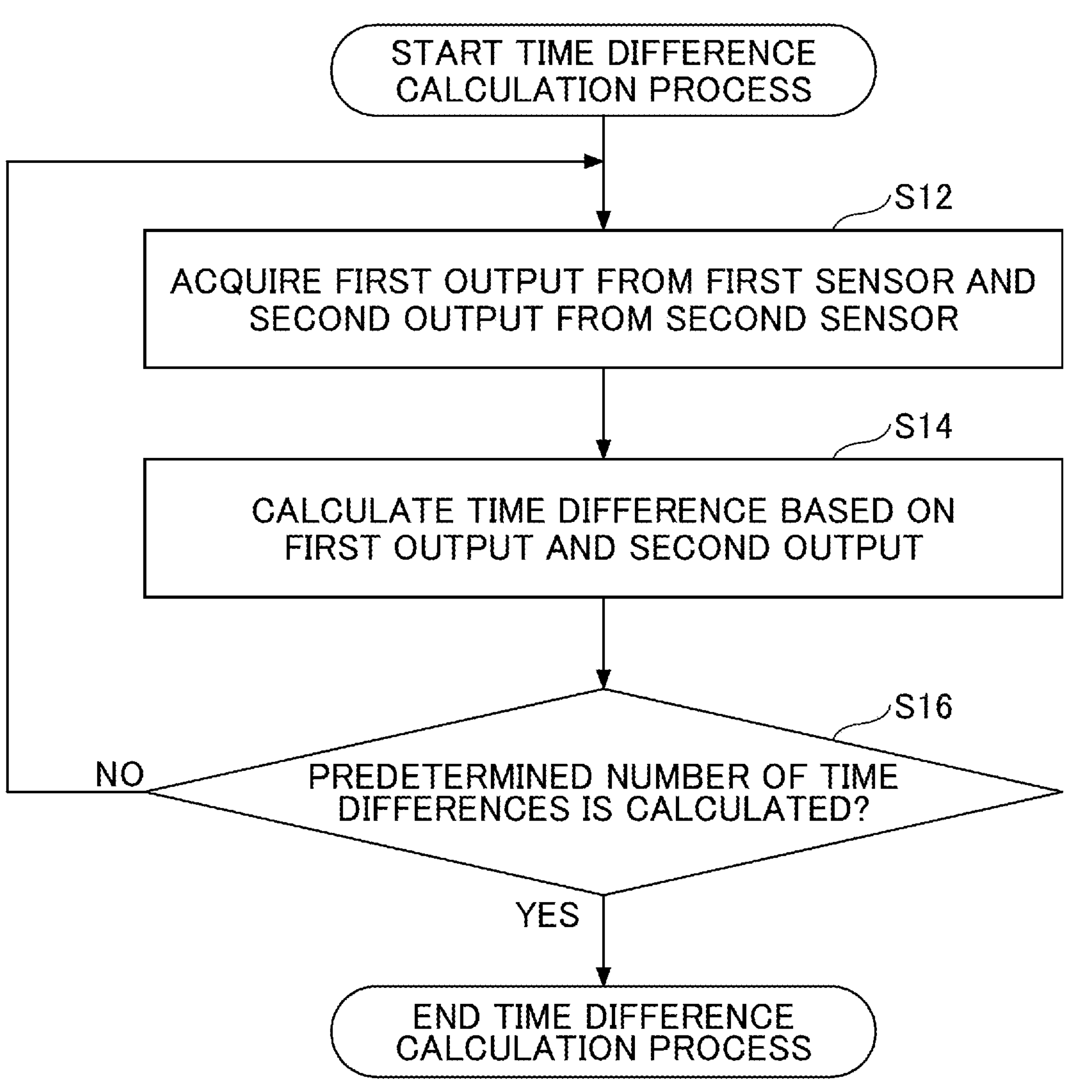
FIG. 6 is a flowchart illustrating a process performed in the fluid measurement system according to the present embodiment.

The time difference calculation process will be described with reference to FIG. 6. FIG. 6 is a flowchart illustrating the time difference calculation process performed in the fluid measurement system 1.

(Step S12)

The measurement controller 20 acquires first output, output from the first sensor 11, and second output, output from the second sensor 12, in a predetermined period of time (measurement period of time). The measurement controller 20 samples the first output from the first sensor and the second output from the second sensor with a sampling period of, for example, 3 milliseconds. The measurement controller 20 stores each of the sampled first output and second output in a memory having a length corresponding to the measurement period of time. The measurement period of time is, for example, 10 seconds.

(Step S14)

Next, based on the first output and second output acquired in step S12, the measurement controller 20 calculates a time difference ΔT (first time difference) between the first output and the second output. The measurement controller 20 calculates a similarity between a waveform of the first output and a waveform of the second output while shifting, in time, data of the second output stored in the memory with respect to data of the first output stored in the memory. The similarity between the waveforms is calculated by the cross-correlation method or the dynamic time warping method. Then, the measurement controller 20 calculates, as a time difference ΔT (first time difference), a period of time for which the data is shifted so that the similarity is maximized.

Note that the cross-correlation method is a method for calculating a similarity between time-series data by cross-correlation. The dynamic time warping method is a method for calculating all distances between two points in two time series and obtaining, as a similarity, a path with the shortest distance between the two time series.

(Step S16)

Next, the measurement controller 20 determines whether a predetermined number of time differences is calculated. If a predetermined number of time differences ΔT is calculated (YES in step S16), the measurement controller 20 ends the time difference calculation process. If a predetermined number of time differences ΔT is not calculated (NO in step S16), the measurement controller 20 returns to step S12 and repeats the processing.

Upon returning to step S12, the measurement controller 20 acquires first output, output from the first sensor 11, and second output, output from the second sensor 12, in a predetermined period of time (measurement period of time) that is shifted from the immediately-previous measurement period of time. Note that the immediately-previous measurement period of time and the next measurement period of time may overlap. That is, the measurement controller 20 may be configured to discard temporally older results of the stored first output and second output data, and add new results by the amount corresponding to the discarded results. Then, the measurement controller 20 repeats the processing.

As described above, the measurement controller 20 repeatedly calculates a time difference ΔT while shifting the measurement period of time. The measurement controller 20 repeatedly calculates a time difference ΔT with a period of, for example, 0.01 seconds (10 milliseconds).

(Step S20)

Next, the measurement controller 20 calculates a frequency distribution in a predetermined period of time (frequency calculation period of time), and calculates a time difference having a high frequency of occurrence (a frequency calculation process). Note that the frequency calculation period of time is greater than the measurement period of time. For example, the frequency calculation period of time is set to include a predetermined number or more of (for example, 100) measurement periods of time. That is, the frequency calculation period of time is set such that the predetermined number or more of time differences ΔT can be obtained. The frequency calculation period of time is, for example, 11 seconds.

Figure 7:
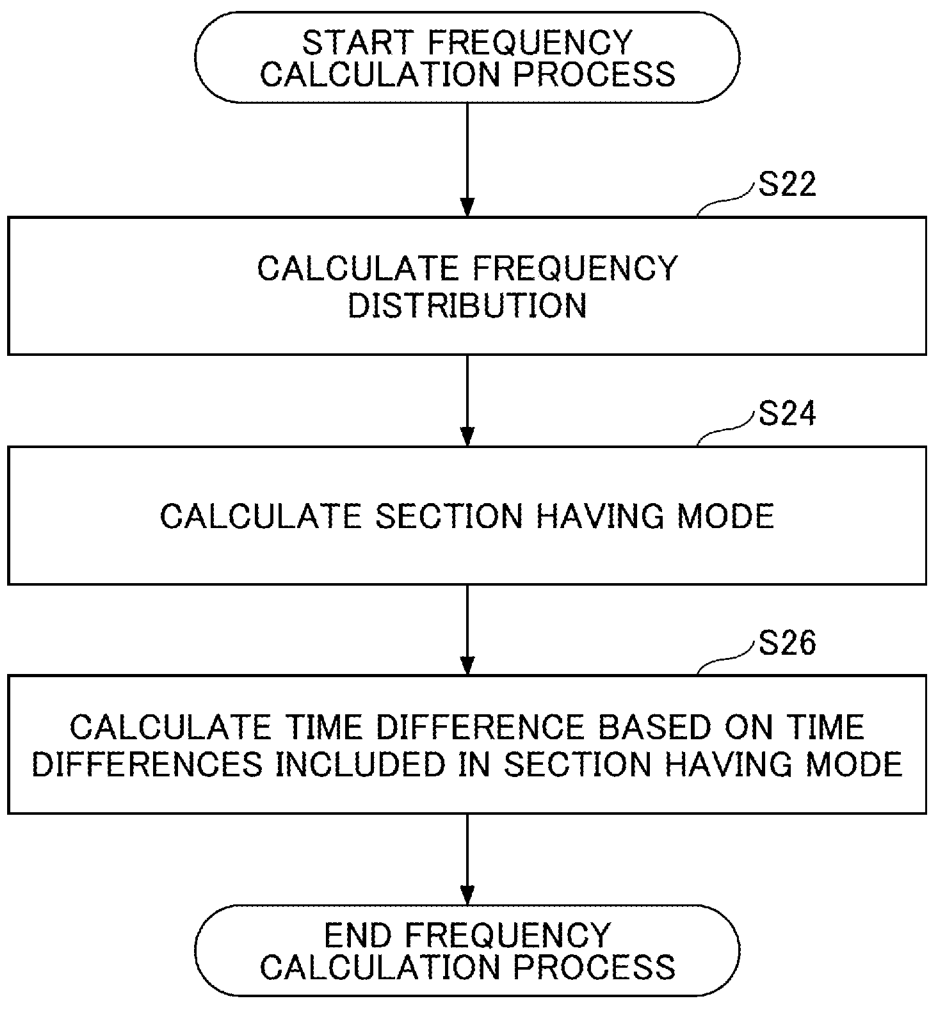
FIG. 7 is a flowchart illustrating a process performed in the fluid measurement system according to the present embodiment.

The frequency calculation process will be described with reference to FIG. 7. FIG. 7 is a flowchart illustrating the frequency calculation process performed in the fluid measurement system 1 according to the present embodiment.

(Step S22)

The measurement controller 20 calculates a frequency distribution based on the plurality of time differences ΔT calculated in step S10. For example, the measurement controller 20 calculates a frequency distribution indicating how many time differences ΔT are included in each section (a time difference section) divided by 0.01 seconds (10 milliseconds).

(Step S24)

Next, the measurement controller 20 calculates a section having the mode based on the frequency distribution calculated in step S22.

(Step S26)

Next, the measurement controller 20 calculates a time difference (second time difference) based on time differences included in the section having the mode. The time difference (second time difference) may be the center value of the section having the mode, or may be the mean or the median of the time differences included in the section having the mode.

(Step S30)

Next, in step S30, the measurement controller 20 calculates the flow velocity based on the calculated time difference (a flow velocity calculation process). For example, the measurement controller 20 calculates the flow velocity based on the calculated time difference according to the Equation 2.

(Step S40)

Next, the measurement controller 20 determines whether to continue or end the processing (a process for determining whether to continue the processing). If the measurement controller 20 determines to continue the processing (YES in step S40), the measurement controller 20 returns to step S10 and repeats the processing. If the measurement controller 20 determines to end the processing (NO in step S40), the measurement controller 20 ends the processing.

SUMMARY

According to the fluid measurement system of the present disclosure, the flow velocity of a measurement fluid can be measured with high accuracy. That is, the fluid measurement system of the present disclosure can highly accurately measure the flow velocity by using a frequency distribution.

Note that the measurement period of time is an example of a first period of time, and the frequency calculation period of time is an example of a second period of time.

It should be understood that the embodiments disclosed herein are exemplary in all respects and are not restrictive. Omissions, substitutions, and changes in various forms of the above-mentioned embodiments may be made without departing from the scope and spirit of the disclosure.

What is claimed is:

1. A fluid measurement system comprising:

a first load sensor and a second load sensor that are disposed on a same pipe carrying a two-phase fluid including a liquid phase and a vapor phase, the first and second load sensors being spaced apart by a predetermined distance;

each of the first load sensor and the second load sensor being configured to output time-series measurement results in real time; and a measurement controller configured to calculate a flow velocity of the two-phase fluid flowing through the pipe based on first output that is output from the first load sensor and second output that is output from the second load sensor, wherein the measurement controller performs a process including (a) acquiring the first output and the second output as respective time-series measurement results;

storing the acquired time-series measurement results in a memory corresponding to the first period of time;

updating the stored time-series measurement results by discarding temporally older measurement results and adding newly acquired measurement results so as to shift the first period of time; and repeatedly calculating, based on the updated time-series measurement results including the newly acquired measurement results, a first time difference between the first output and the second output while shifting the first period of time, (b) calculating a second time difference by:

calculating a frequency of occurrence of a plurality of first time differences obtained in a second period of time that is greater than the first period of time;

excluding, from the plurality of first time differences, time differences of zero; and selecting first time differences included in a time difference section having a mode in the frequency of occurrence and determining the second time difference based only on the selected first time differences, and (c) calculating the flow velocity of the two-phase fluid based on the second time difference.

2. The fluid measurement system according to claim 1, wherein (b) includes:

(b1) calculating a frequency distribution of the plurality of first time differences, each of the first time differences being calculated in the first period of time included in the second period of time, and (b2) excluding, from the plurality of first time differences, time differences of zero; and (b3) selecting first time differences included in a time difference section having a mode in the frequency distribution and calculating the second time difference based only on the selected given first time differences.

3. The fluid measurement system according to claim 1, wherein, in (a), a cross-correlation method or a dynamic time warping method is used to calculate the first time difference based on the first output and the second output.

4. A fluid measurement method comprising:

(a) acquiring first output that is output from a first load sensor and second output that is output from a second load sensor as respective time-series measurement results, storing the acquired time-series measurement results in a memory corresponding to a first period of time, updating the stored time-series measurement results by discarding temporally older measurement results and adding newly acquired measurement results so as to shift the first period of time, and repeatedly calculating, based on the updated time-series measurement results including the newly acquired measurement results, a first time difference between the first output and the second output while shifting the first period of time, the first load sensor and the second load sensor being disposed on a same pipe carrying a two-phase fluid including a liquid phase and a vapor phase, the first and second load sensors being spaced apart by a predetermined distance;

(b) calculating a second time difference by:

calculating a frequency of occurrence of a plurality of first time differences obtained in the first period of time included in a second period of time that is greater than the first period of time;

excluding, from the plurality of first time differences, time differences of zero; and selecting first time differences included in a time difference section having a mode in the frequency of occurrence and determining the second time difference based only on the selected first time differences, and (c) calculating a flow velocity of the two-phase fluid based on the second time difference.

* * * * *